(12) United States Patent
Yanagihara et al.

(10) Patent No.: US 9,190,947 B2
(45) Date of Patent: Nov. 17, 2015

(54) ELECTRIC POWER TOOL

(71) Applicant: MAKITA CORPORATION, Anjo-shi, Aichi (JP)

(72) Inventors: Kenya Yanagihara, Anjo (JP); Yoshitaka Ichikawa, Anjo (JP); Motohiro Omura, Anjo (JP); Yutaka Matsunaga, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 13/760,435

(22) Filed: Feb. 6, 2013

(65) Prior Publication Data

US 2013/0207590 A1 Aug. 15, 2013

(30) Foreign Application Priority Data

Feb. 9, 2012 (JP) ................... 2012-026270

(51) Int. Cl.
*H02P 6/00* (2006.01)
*H02P 23/08* (2006.01)
*H02P 23/00* (2006.01)
*B25F 5/00* (2006.01)

(52) U.S. Cl.
CPC . *H02P 23/08* (2013.01); *B25F 5/00* (2013.01); *H02P 23/00* (2013.01)

(58) Field of Classification Search
CPC ............... H02P 2005/4016; H02P 2007/6213; H02P 2021/0082; H02P 21/08; H02P 21/085; H02P 23/08
USPC ............. 318/727, 798, 803, 812, 823, 400.35
See application file for complete search history.

(56) References Cited

U.S. PATENT DOCUMENTS

| | | | | |
|---|---|---|---|---|
| 3,697,782 A | * | 10/1972 | Matouka | ........................ 327/28 |
| 4,348,627 A | | 9/1982 | Fulton | |
| 4,835,410 A | | 5/1989 | Bhagwat et al. | |
| 4,958,406 A | * | 9/1990 | Toyoshima et al. | ............. 15/319 |
| 5,166,585 A | * | 11/1992 | Koharagi et al. | ........ 318/400.08 |
| 5,294,872 A | * | 3/1994 | Koharagi et al. | ........ 318/400.15 |
| 5,488,281 A | * | 1/1996 | Unsworth et al. | ............ 318/806 |
| 5,500,581 A | * | 3/1996 | Hatanaka et al. | ............. 318/727 |
| 5,541,488 A | * | 7/1996 | Bansal et al. | ................. 318/801 |
| 5,747,957 A | * | 5/1998 | Hayashida | .................... 318/799 |
| 5,793,623 A | * | 8/1998 | Kawashima et al. | ....... 363/56.05 |
| 5,821,727 A | * | 10/1998 | Yura | .............................. 318/809 |
| 5,969,498 A | * | 10/1999 | Cooke | .......................... 318/799 |

(Continued)

FOREIGN PATENT DOCUMENTS

| | | |
|---|---|---|
| EP | 1 738 877 A2 | 1/2007 |
| EP | 2 058 940 A1 | 5/2009 |

(Continued)

OTHER PUBLICATIONS

Jun. 5, 2013 European Search Report issued in European Patent Application No. 13154465.2.
Office Action dated Jun. 6, 2014 issued in European Patent Application No. 13 154 465.2.

(Continued)

*Primary Examiner* — Eduardo Colon Santana
*Assistant Examiner* — Bickey Dhakal
(74) *Attorney, Agent, or Firm* — Oliff PLC (57) ABSTRACT

An electric power tool according to the present invention is provided with a tool main body, an induction motor, a power supply unit, and an inverter. The power supply unit and the inverter are integrally incorporated in the tool main body together with the induction motor.

9 Claims, 4 Drawing Sheets

(56) References Cited

U.S. PATENT DOCUMENTS

| | | | |
|---|---|---|---|
| 6,166,514 A * | 12/2000 | Ando et al. | 318/811 |
| 6,605,919 B1 * | 8/2003 | Branecky | 318/729 |
| 7,794,305 B2 | 9/2010 | Nelson | |
| 8,106,620 B2 * | 1/2012 | Kitanaka | 318/807 |
| 8,294,411 B2 * | 10/2012 | Okita et al. | 318/801 |
| 2003/0127932 A1 | 7/2003 | Ishida et al. | |
| 2007/0000676 A1 | 1/2007 | Arimura | |
| 2010/0237821 A1 | 9/2010 | Kitanaka | |
| 2010/0315034 A1 * | 12/2010 | Lu et al. | 318/802 |
| 2011/0148332 A1 | 6/2011 | Kawano et al. | |
| 2011/0284256 A1 | 11/2011 | Iwata | |
| 2013/0000934 A1 * | 1/2013 | Tadokoro et al. | 173/20 |
| 2013/0043824 A1 * | 2/2013 | Baratta et al. | 318/807 |

FOREIGN PATENT DOCUMENTS

| | | |
|---|---|---|
| EP | 2 471 633 A2 | 7/2012 |
| JP | A-2-79794 | 3/1990 |
| JP | H06-62590 A | 3/1994 |
| JP | A-7-308871 | 11/1995 |
| JP | H07-337088 A | 12/1995 |
| JP | 2005051900 A | 2/2005 |
| JP | 2010173042 A | 8/2010 |
| JP | 2011148069 A | 8/2011 |
| JP | 2011161605 A | 8/2011 |

OTHER PUBLICATIONS

May 26, 2015 Office Action issued in Japanese Application No. 2012-026270.

\* cited by examiner

ELECTRIC POWER TOOL

CROSS-REFERENCE TO RELATED APPLICATIONS

This application claims the benefit of Japanese Patent Application No. 2012-026270 filed on Feb. 9, 2012 in the Japan Patent Office, the disclosure of which is incorporated herein by reference.

BACKGROUND

The present invention relates to an electric power tool provided with an induction motor.

The electric power tool of this type is generally provided with: a power supply unit for generating a direct current voltage by rectifying an alternating current voltage supplied from an external alternating-current power source; and an inverter that controls an electric current flowing through each of phase windings of the induction motor due to the direct current voltage generated in the power supply unit.

For example, as disclosed in Japanese Unexamined Patent Application Publication No. H7-308871 and U.S. Pat. No. 7,794,305, the power supply unit and the inverter are, as a drive device for the electric power tool, generally constituted separately from a tool main body provided with the induction motor.

SUMMARY

In the electric power tool described as above, a user needs to operate the tool main body with the drive device being connected thereto via a cable. For this reason, there has been a problem in which usability of the above-described electric power tool is not excellent since, when the user uses the electric power tool by gripping the tool main body with the user's hands, the drive device or the cable would interfere with such use.

Moreover, when moving the electric power tool, the user needs to carry not only the tool main body but also the drive device. Accordingly, this point also causes a problem in which usability of the above-described electric power tool is not excellent.

In one aspect of the present invention, in the electric power tool provided with the induction motor, it is preferable to improve usability of the electric power tool of this type, by constituting the power supply unit and the inverter integrally with the tool main body.

An electric power tool of the present invention is provided with a tool main body, an induction motor, a power supply unit, and an inverter. The induction motor is configured to generate a power of the electric power tool. The power supply unit is configured to rectify an alternating-current voltage supplied from an external alternating-current power source and generate a drive voltage for driving the induction motor. The inverter is configured to receive supply of the drive voltage from the power supply unit and drive the induction motor. The power supply unit and the inverter are integrally incorporated in the tool main body together with the induction motor.

According to the electric power tool of the present invention, usability of the electric power tool may be improved, compared with a conventional device in which the drive device containing the power supply unit and the inverter thereinside is constituted separately from the tool main body.

Moreover, when the user of the electric power tool of the present invention carries the electric power tool, it is not necessary for the user to hold the tool main body and the drive device separately from each other. Therefore, according to the electric power tool of the present invention, improved workability can be achieved when moving the electric power tool by the user.

The electric power tool of the present invention may be constituted as follows.

Specifically, the induction motor may include at least one phase winding. The power supply unit may include a rectifier circuit configured to perform full-wave rectification of the alternating-current voltage and output a full-wave rectified voltage as an output voltage. The inverter may include: a switching circuit having a plurality of switching elements configured to apply the output voltage outputted from the rectifier circuit to the at least one phase winding of the induction motor; and a control unit configured to perform a drive control of each of the plurality of switching elements so that a rotation speed of the induction motor becomes a predetermined speed. The control unit may include; a drive frequency calculation unit configured to set a drive frequency of the induction motor, based on a rotation speed of the induction motor and a slip frequency of the induction motor; a drive unit configured to drive each of the plurality of switching elements depending on the drive frequency set by the drive frequency calculation unit; and a slip frequency setting unit configured to set the slip frequency depending on a change in the drive voltage generated in the power supply unit.

In the electric power tool constituted as above, although an output voltage to be inputted to the switching circuit varies, it may be possible to stably flow an electric current to the induction motor without providing a voltage smoothing capacitor or a power factor improvement circuit, and therefore, it may be possible to drive the induction motor in an appropriate manner. Furthermore, since the voltage smoothing capacitor or the power factor improvement circuit is not required in this electric power tool, it may be possible to inhibit a size increase of the tool main body.

The electric power tool constituted as above may further include an output voltage detection circuit configured to detect a level of the output voltage outputted from the rectifier circuit. In this case, the slip frequency setting unit may detect, from the level of the output voltage detected by the output voltage detection circuit, a change in the drive voltage generated in the power supply unit so as to set the slip frequency.

The slip frequency setting unit may set the slip frequency in any manner. For example, the slip frequency setting unit may be configured to set the slip frequency such that, when the output voltage is high, the slip frequency becomes low, and when the output voltage is low, the slip frequency becomes high.

The electric power tool of the present invention may include a zero-cross detection circuit configured to detect each of a plurality of zero-cross points of the alternating-current voltage supplied from the alternating-current power source. In this case, the slip frequency setting unit may be configured to detect, from the each of the plurality of zero-cross points detected by the zero-cross detection circuit, a change in the drive voltage generated in the power supply unit so as to set the slip frequency.

The slip frequency setting unit may set the slip frequency in any manner. For example, the slip frequency setting unit may be configured to set the slip frequency such that: when a zero-cross point is detected by the zero-cross detection circuit, the slip frequency is set to have a predetermined maximum frequency; approximately at a middle point of a time period between the zero-cross point and a next zero-cross point, the slip frequency is set to have a predetermined minimum frequency; and when the next zero-cross point is detected by the zero-cross detection circuit, the slip frequency is set to have the predetermined maximum frequency.

The electric power tool of the present invention may include an actual rotation speed detection unit configured to detect an actual rotation speed of the induction motor, and a target rotation speed setting unit configured to set a target rotation speed of the induction motor.

In this case, the drive frequency calculation unit may be configured to set the drive frequency of the induction motor, based on the target rotation speed set by the target rotation speed setting unit, the actual rotation speed detected by the actual rotation speed detection unit, and the slip frequency set by the slip frequency setting unit, such that the actual rotation speed of the induction motor becomes the target rotation speed.

In the electric power tool constituted as above, it may be possible to set the drive frequency of the induction motor such that a deviation of the actual rotation speed from the target rotation speed becomes zero, for example, by a known PID control; therefore, it may be possible to control the induction motor to operate at the target rotation speed in a more preferable manner.

BRIEF DESCRIPTION OF THE DRAWINGS

The invention will now be described below, by way of example, with reference to the accompanying drawings, in which.

DETAILED DESCRIPTION OF THE PREFERRED EMBODIMENTS

Figure 1:
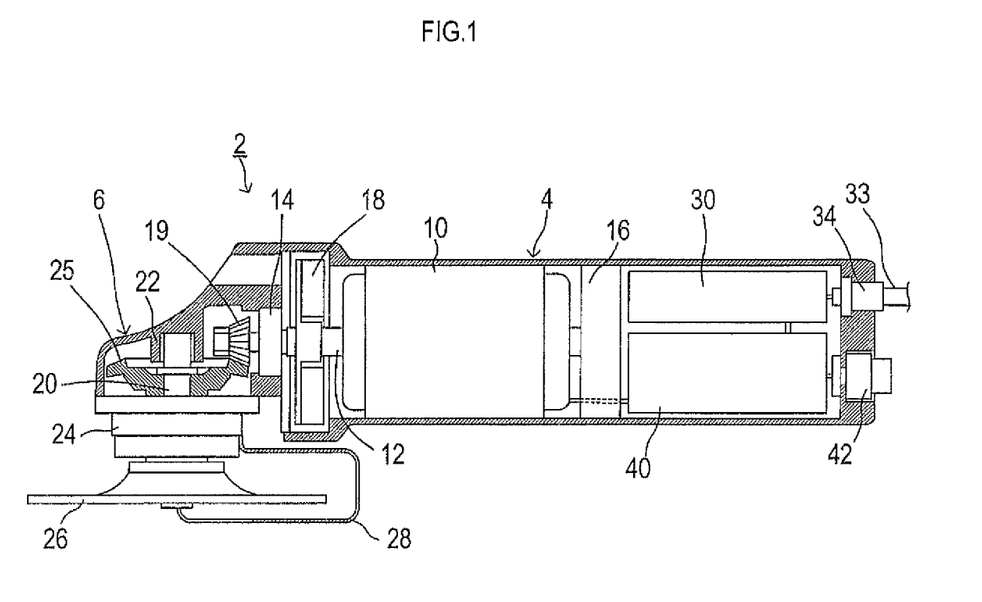
FIG. 1 is a cross sectional view showing an internal configuration of an electric power tool according to an embodiment.

As shown in FIG. 1, an electric power tool 2 in the present embodiment is constituted as a so-called grinder. The electric power tool 2 is provided with a motor housing 4 and a gear housing 6 which are formed integrally with each other; inside of these housings 4 and 6, various functional components are incorporated.

The motor housing 4 is formed in a cylindrical shape so as to allow a user of the electric power tool 2 to grip the motor housing 4. Inside the motor housing 4, a three-phase induction motor (hereinafter, simply referred to as "motor") 10 is accommodated. The motor 10 is a power source of the electric power tool 2.

The motor 10 is a so-called high frequency motor. The motor 10 is fixed within the motor housing 4, in a state where a rotary shaft 12 of the motor 10 coincides with a central axis of the motor housing 4 and one end (front end) of the rotary shaft 12 projects into the gear housing 6.

A portion of the rotary shaft 12 at the one end (front end) side thereof is rotatably supported by the gear housing 6 via a bearing 14 provided in the gear housing 6. A portion of the rotary shaft 12 at the other end (rear end) side thereof is rotatably supported by the motor housing 4 via a bearing 16 provided in the motor housing 4. A fan 18 is provided in a portion, which is located between the motor 10 and the bearing 14, of the rotary shaft 12. The fan 18 is used to send cooling air toward the motor 10.

To the gear housing 6, a spindle 20 is rotatably fixed via bearings 22 and 24. A central axis of the spindle 20 is fixed in a direction orthogonal to the central axis of the motor housing 4 (and therefore, the rotary shaft 12 of the motor 10).

A bevel gear 25 is fixed to a portion, which is located between the bearing 22 and the bearing 24, of the spindle 20. The bevel gear 25 is caused to engage with a bevel gear 19 fixed to the front end of the rotary shaft 12 of the motor 10 so as to transmit rotation of the motor 10 to the spindle 20, thereby rotating the spindle 20.

One end of the spindle 20 projects from the bearing 24 to outside of the gear housing 6, so that a disk-shaped grinding stone 26 can be attached to the one end of the spindle 20. Attached to an outer circumference of the bearing 24 is a cover 28 which surrounds a portion, which is located at a side of the motor housing 4, of the grinding stone 26 attached to the spindle 20.

Inside the motor housing 4, a power supply unit 30 and an inverter 40 for driving the motor 10 are accommodated at a position rearward from the bearing 16 located at a rear-end side of the motor 10. A rear end of the motor housing 4 is closed; on such a closed part of the rear end of the motor housing 4, a connector 34 and an operation unit 42 are provided. The connector 34 is provided for connection to a power supply cable 33.

The connector 34 is configured to receive an alternating-current (AC) voltage from an external AC power source 32 (see, FIG. 2) through the power supply cable 33, and supply the AC voltage to the power supply unit 30. The operation unit 42 is configured such that, by being operated by the user of the electric power tool 2, the operation unit 42 inputs to the electric power tool 2 a drive command for driving the electric power tool 2 (i.e., the motor 10). The operation unit 42 is connected to the inverter 40.

Next, circuit configurations of the power supply unit 30 and the inverter 40 will be described with reference to FIG. 2.

Figure 2:
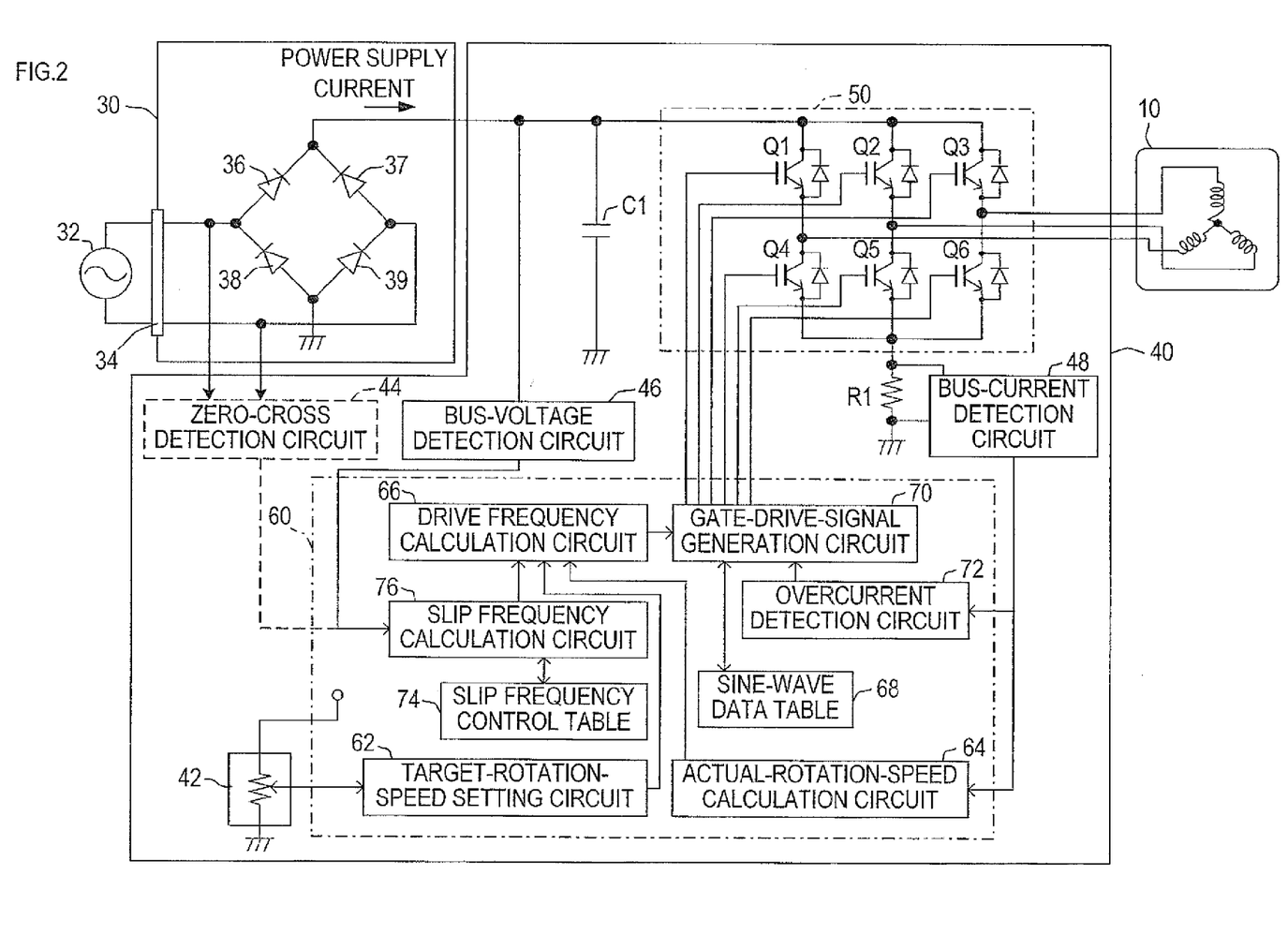
FIG. 2 is a block diagram showing circuit configurations of a power supply unit and an inverter in the electric power tool.

As shown in FIG. 2, the power supply unit 30 includes a full-wave rectifier circuit formed with four rectifier diodes 36, 37, 38, and 39.

A voltage (hereinafter, referred to as "bus voltage"), which is obtained by full-wave rectification of the AC voltage inputted from the AC power source 32, is directly inputted to the inverter 40 from the power supply unit 30.

The inverter 40 includes a switching circuit 50 and a control circuit 60. The switching circuit 50 performs switching of a state of current conduction to each of phase windings of the motor 10. The control circuit 60 controls on/off states of six switching elements Q1, Q2, Q3, Q4, Q5, and Q6 which constitute the switching circuit 50, thereby performing a drive control of the motor 10.

Here, the control circuit 60 of the present embodiment may be constituted by combining various individual electronic components, constituted as an ASIC (Application Specified Integrated Circuit), constituted as a programmable logic device such as an FPGA (Field Programmable Gate Array), or constituted by any combination of the aforementioned constitutions.

In the switching circuit 50, the aforementioned switching elements Q1, Q2, and Q3 are provided, as high-side switches, between an input line for the bus voltage from the power supply unit 30, and the respective phase windings of the motor 10; and the aforementioned switching elements Q4, Q5, and Q6 are provided, as low-side switches, between the respective phase windings of the motor 10 and a ground line.

On a current path from the switching circuit 50 to the ground line, a resistor R1 is provided. The resistor R1 is a resistor for detecting a total current (hereinafter, referred to as "bus current") which has flowed through each of the phase windings of the motor 10.

Both ends of the resistor R1 are connected to a bus-current detection circuit 48 that detects the bus current based on a voltage between the both ends of the resistor R1. A detection signal from the bus-current detection circuit 48 is inputted to the control circuit 60.

The inverter 40 is further provided with a bus-voltage detection circuit 46. The bus-voltage detection circuit 46 is connected to the input line for the bus voltage from the power supply unit 30 and detects the bus voltage. A detection signal from the bus-voltage detection circuit 46 is also inputted to the control circuit 60.

The inverter 40 is further provided with a capacitor C1. One end of the capacitor C1 is connected to the input line for the bus voltage from the power supply unit 30, while the other end of the capacitor C1 is connected to the ground line.

This capacitor C1 is, not a smoothing capacitor that smoothes the bus voltage to a constant voltage, but a bypass capacitor that removes a high frequency noise from the bus voltage. Accordingly, the capacitor C1 is significantly smaller than the smoothing capacitor in capacity and small in size.

Moreover, the control circuit 60 is provided with a target-rotation-speed setting circuit 62 and an actual-rotation-speed calculation circuit 64. The target-rotation-speed setting circuit 62 sets a target rotation speed of the motor 10 in accordance with the drive command inputted from the operation unit 42. The actual-rotation-speed calculation circuit 64 calculates an actual rotation speed of the motor 10 based on the bus current detected by the bus-current detection circuit 48. The target rotation speed and the actual rotation speed, which are obtained respectively by the target-rotation-speed setting circuit 62 and the actual-rotation-speed calculation circuit 64, are inputted to a drive frequency calculation circuit 66 provided in the control circuit 60.

The drive frequency calculation circuit 66 calculates a drive frequency of the motor 10 for the switching circuit 50, based on the target rotation speed, the actual rotation speed, and a slip frequency.

For example, the drive frequency calculation circuit 66 firstly calculates, based on the target rotation speed and the slip frequency, a drive frequency required to drive the motor 10 at the target rotation speed, and then corrects the calculated drive frequency based on a difference between the actual rotation speed and the target rotation speed, thereby setting the drive frequency to be used for controlling the motor 10.

The drive frequency set by the drive frequency calculation circuit 66 as described above is inputted to a gate-drive-signal generation circuit 70 provided in the control circuit 60.

The gate-drive-signal generation circuit 70 reads out a sine-wave data from a sine-wave data table 68 provided in the control circuit 60, sets a driving timing for each of the switching elements Q1 to Q6 inside the switching circuit 50, and generates a gate drive signal of each of the switching elements Q1 to Q6.

The drive frequency is used to control a speed at which the gate-drive-signal generation circuit 70 reads out the sine-wave data from the sine-wave data table 68 (in other words, to control an interval between phases).

The control circuit 60 is provided with an overcurrent detection circuit 72. The overcurrent detection circuit 72 detects that overcurrent is flowing through the motor 10, based on the detection signal from the bus-current detection circuit 48. When the overcurrent detection circuit 72 detects flowing of overcurrent, driving of each of the switching elements Q1 to Q6 by the gate-drive-signal generation circuit 70 is stopped.

The control circuit 60 is further provided with a slip frequency control table 74 and a slip frequency calculation circuit 76.

In the slip frequency control table 74, a slip frequency data is stored. The slip frequency data is a data for setting the slip frequency which is used for the drive frequency calculation circuit 66 to calculate the drive frequency by using the bus voltage detected by the bus-voltage detection circuit 46 as a parameter.

Based on the bus voltage detected by the bus-voltage detection circuit 46, the slip frequency calculation circuit 76 reads out the slip frequency corresponding to the detected bus voltage from the slip frequency control table 74, and outputs the read slip frequency to the aforementioned drive frequency calculation circuit 66.

Figure 3A:
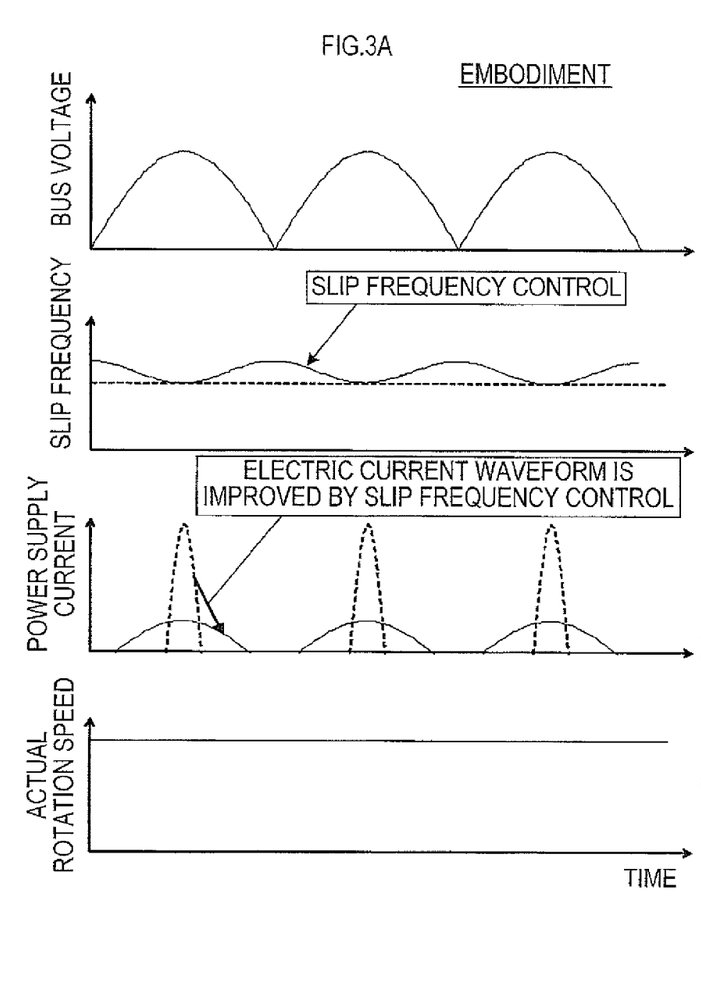
FIGS. 3A and 3B are graphs each of which showing a bus voltage, a slip frequency, a power supply current, and an actual rotation speed, FIG. 3A being the graph corresponding to the circuit configurations according to the embodiment shown in FIG. 2, and FIG. 3B being the graph corresponding to a conventional circuit provided with a smoothing capacitor and a power factor improvement circuit.

In the present embodiment, as shown in FIG. 3A, the bus voltage is a voltage which is obtained by merely full-wave rectification of the AC voltage supplied from the AC power source 32. Thus, in a case where the slip frequency is maintained to be constant, an electric current (a power supply current) flows from the power supply unit 30 to the inverter 40 (and further to the motor 10) only around a peak of the bus voltage; consequently, the motor 10 cannot be stably driven.

The slip frequency calculation circuit 76 in the present embodiment is configured as follows: by controlling the slip frequency such that when the varying bus voltage is high, the slip frequency is low, and when the varying bus voltage is low, the slip frequency is high, a peak of the power supply current is suppressed, so that the power supply current can be supplied to a wider area.

As a result of this, according to the present embodiment, it is possible to make a rotation speed of the motor 10 stable, without providing the smoothing capacitor or a power factor improvement circuit in a bus-voltage input path from the power supply unit 30 to the switching circuit 50 as in a conventional manner.

Figure 3B:
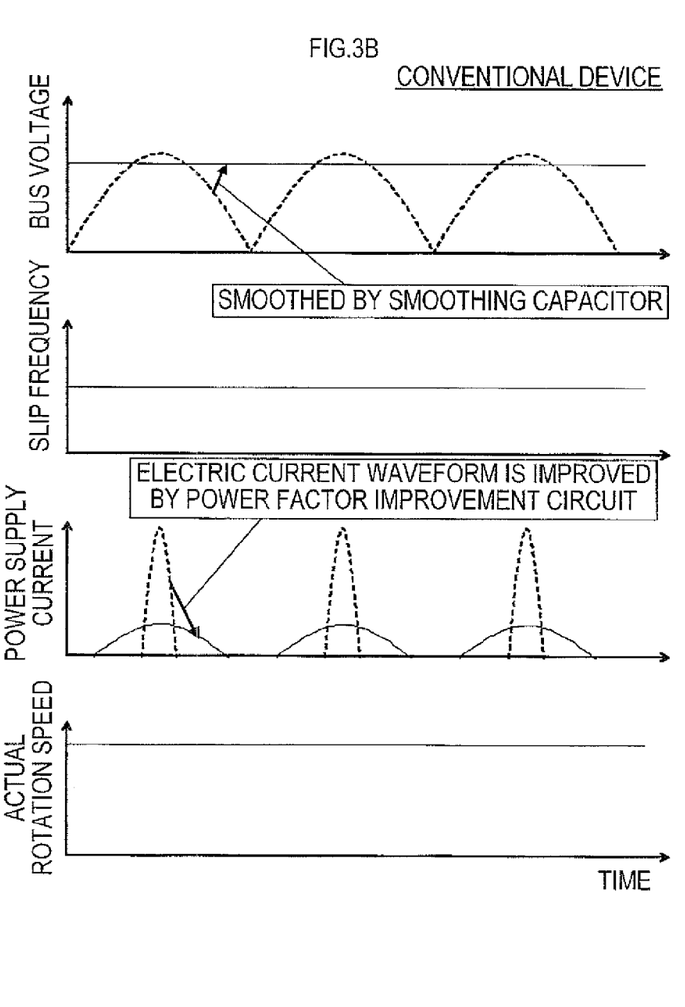

Specifically, as shown in FIG. 3B, in a conventional device, the bus voltage is made to be constant by providing the smoothing capacitor in the bus-voltage input path from the power supply unit to the switching circuit; a range in which the power supply current can be supplied is expanded; and thereby, the rotation speed of the motor is made to be stable by providing the power factor improvement circuit in the bus-voltage input path.

On the other hand, in the present embodiment, it is possible to make the rotation speed of the motor 10 stable, without providing the smoothing capacitor or the power factor improvement circuit as in a conventional device.

Accordingly, according to the electric power tool 2 of the present embodiment, the power supply unit 30 and the inverter 40 can be constituted without using a large-sized electronic component, such as a smoothing capacitor or an inductor composing the power factor improvement circuit. Thus, it is possible to downsize the power supply unit 30 and the inverter 40.

Therefore, a size of the electric power tool 2 does not become significantly large; thus, it is possible to provide the electric power tool 2 which can be operated by the user while being held by the user's hands, even if the power supply unit 30 and the inverter 40 are accommodated, together with the motor 10, inside the motor housing 4, which is a tool main body, of the electric power tool 2 as in the present embodiment.

Moreover, according to the electric power tool 2 in the present embodiment, it is not necessary to constitute a drive device, which is composed of the power supply unit 30 and the inverter 40, as a separate body from the tool main body, and to connect the tool main body to the drive device via a cable as in a conventional manner. For this reason, it is possible to inhibit interference by the drive device and the cable when the electric power tool is used, thereby achieving an improved operability of the electric power tool.

In the present embodiment, the control circuit 60 corresponds to an example of a control unit of the present invention; the drive frequency calculation circuit 66 corresponds to an example of a drive frequency calculation unit of the present invention; the gate-drive-signal generation circuit 70 corresponds to an example of a drive unit of the present invention; the slip frequency calculation circuit 76 and the slip frequency control table 74 correspond to an example of a slip frequency setting unit of the present invention. Furthermore, the target-rotation-speed setting circuit 62 corresponds to an example of a target rotation speed setting unit of the present invention; the actual-rotation-speed calculation circuit 64 corresponds to an example of an actual rotation speed detection unit of the present invention; and the bus-voltage detection circuit 46 corresponds to an example of an output voltage detection circuit of the present invention.

Although one embodiment of the present invention has been explained as above, the present invention should not be limited to the above-described embodiment, but can be practiced in various manners without departing from a gist of the present invention.

For example, although the control circuit 60 of the above-described embodiment can be constituted by using various calculation circuits, the control circuit 60 can be also constituted by using a known microcomputer mainly composed of a CPU, a ROM, a RAM, etc.

Figure 4:
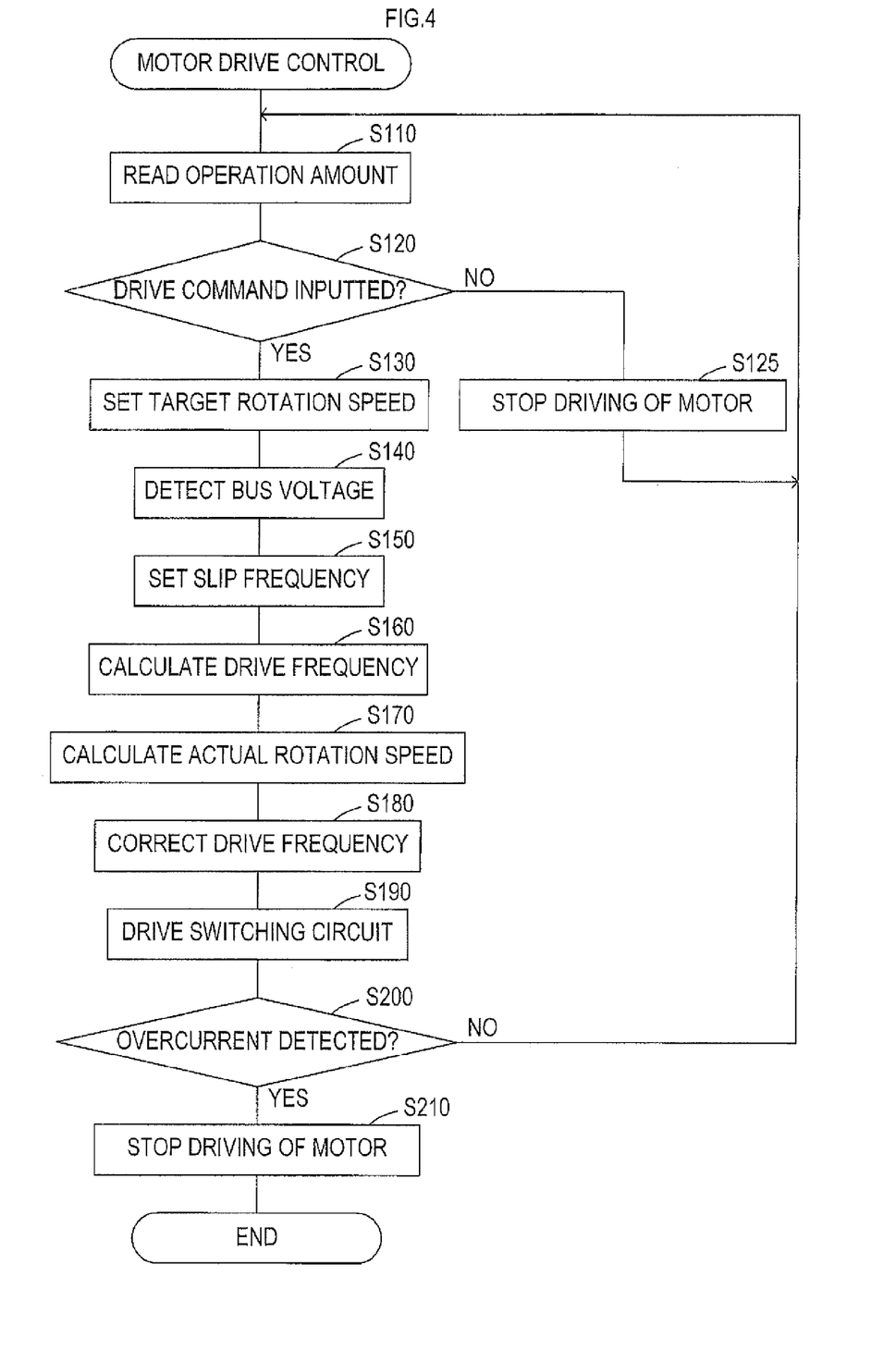
FIG. 4 is a flowchart showing a motor drive control process which is executed in a control circuit in a case where the control circuit is constituted by a microcomputer.

In this case, respective functions of the target-rotation-speed setting circuit 62, the actual-rotation-speed calculation circuit 64, the drive frequency calculation circuit 66, the gate-drive-signal generation circuit 70, the overcurrent detection circuit 72, and the slip frequency calculation circuit 76 can be achieved by making the CPU of the microcomputer execute a motor drive control process illustrated in FIG. 4.

Hereinafter, the motor drive control process will be explained.

The motor drive control process is realized by the CPU which, after the microcomputer starts up, repeatedly executes one of control programs pre-stored in the ROM as a storage medium.

Here, when executing the motor drive control process, data as the sine-wave data table 68 and data as the slip frequency control table 74 are pre-stored in the ROM of the microcomputer.

As shown in FIG. 4, in the motor drive control process, first in S110 (S represents a step), an operation amount (specifically, a resistance value of variable resistance) is read from the operation unit 42. In S120, it is determined based on the read operation amount whether or not a drive command for the electric power tool 2 has been inputted.

If it is determined in S120 that, for example, the operation amount is equal to less than a predetermined threshold value and that the drive command for the electric power tool 2 has not been inputted, the process proceeds to S125 to stop driving of the motor 10. Thereafter, the process proceeds to S110 again.

On the other hand, if it is determined in S120 that the drive command for the electric power tool 2 has been inputted, in S130, based on the drive command (specifically, the operation amount of the operation unit 42), a target rotation speed of the motor 10 is set such that as the operation amount of the operation unit 42 is greater, a rotation speed becomes higher.

In S140, a bus voltage is detected through the bus-voltage detection circuit 46. In the subsequent S150, a slip frequency corresponding to the bus voltage detected in S140 is read out from the slip frequency control table 74. In S160, based on the read slip frequency and the target rotation speed set in S130, a drive frequency required to drive the motor 10 at the target rotation speed is calculated.

Next, in S170, based on a bus current detected by the bus-current detection circuit 48, an actual rotation speed of the motor 10 is calculated. Then, the process proceeds to S180.

In S180, based on a difference between the actual rotation speed of the motor 10 calculated in S170 and the target rotation speed set in S130, a correction amount of the drive frequency, which is required to control the actual rotation speed to be the target rotation speed, is calculated; then, the drive frequency calculated in S160 is corrected by the correction amount, thereby obtaining a drive frequency to be used for control.

In the subsequent S190, a drive process of the switching circuit 50 is executed. Specifically, in this drive process, a driving timing for each of the switching elements Q1 to Q6 inside the switching circuit 50 is set by using the drive frequency corrected in S180 and the sine-wave data table 68, and then, each of the switching elements Q1 to Q6 is individually turned on and off based on the set driving timing.

Next, in S200, based on the detection signal from the bus-current detection circuit 48, it is determined whether or not overcurrent is flowing through the motor 10. If it is determined that overcurrent is not flowing, the process proceeds to S110. If it is determined that overcurrent is flowing, driving of the motor 10 is stopped in S210, and thereafter, the present motor drive control is terminated.

If the driving of the motor 10 is stopped in S210, the occurrence of the overcurrent is notified to the user by lighting an LED (not shown) for notifying occurrence of overcurrent.

As has been explained above, even if the control circuit 60 is constituted by the microcomputer, the microcomputer can achieve the same function as that of the control circuit 60 shown in FIG. 2 by making the CPU of the microcomputer execute the aforementioned motor drive control.

In the motor drive control process shown in FIG. 4, the processing in S130 functions as an example of a target rotation speed setting unit of the present invention; the processing in S150 functions as an example of a slip frequency setting unit of the present invention; the processings in S160 and S180 function as an example of a drive frequency calculation unit of the present invention; the processing in S170 functions as an example of an actual rotation speed detection unit of the present invention; and the processing in S190 functions as an example of a drive unit of the present invention.

Moreover, in the above-described embodiment, it is explained that the inverter 40 is provided with the bus-voltage detection circuit 46. However, as shown by broken lines in FIG. 2, instead of the bus-voltage detection circuit 46, a zero-cross detection circuit 44 may be provided in the inverter 40.

The zero-cross detection circuit 44 detects a zero-cross point of the AC voltage inputted to the power supply unit 30 from the external AC power source 32. Therefore, based on timings of detections of the zero-cross points which are repeatedly detected by the zero-cross detection circuit 44, a phase of the AC voltage (and therefore, the bus voltage) can be detected.

Accordingly, even if the zero-cross detection circuit 44 is provided instead of the bus-voltage detection circuit 46, in the slip frequency calculation circuit 76, it is possible to read the slip frequency corresponding to the bus voltage from the slip frequency control table, by detecting (estimating) the bus voltage which periodically varies.

In this case, the slip frequency calculation circuit 76 may be configured as follows. When a zero-cross point is detected by the zero-cross detection circuit 44, the slip frequency calculation circuit 76 sets the slip frequency to have a predetermined maximum frequency. Approximately at a middle point of a time period between the zero-cross point and a next zero-cross point, the slip frequency calculation circuit 76 sets the slip frequency to have a predetermined minimum frequency. Furthermore, when the next zero-cross point is detected by the zero-cross detection circuit 44, the slip frequency calculation circuit 76 sets the slip frequency to have the predetermined maximum frequency.

In FIG. 3A, when a value of the bus voltage is zero, the slip frequency becomes maximum, while when a value of the bus voltage is a peak value, the slip frequency becomes minimum. Considering that the bus voltage shown in FIG. 3A is a voltage which is obtained by merely full-wave rectification of the AC voltage of the AC power source 32, it is obvious that in the slip frequency calculation circuit 76 constituted as above, the slip frequency is set so as to have a waveform which is the same as a waveform of the slip frequency shown in FIG. 3A.

Furthermore, in the above-described embodiment, it is explained that when the actual rotation speed of the motor 10 is obtained in the actual-rotation-speed calculation circuit 64 and the drive frequency is calculated in the drive frequency calculation circuit 66, the drive frequency, which is calculated by using the target rotation speed and the slip frequency, is corrected based on the difference from the target rotation speed.

However, such a feedback control does not necessarily need to be performed. The drive frequency of the motor 10 by the switching circuit 50 may be calculated by simply using the target rotation speed and the slip frequency.

Moreover, in the above-described embodiment, the explanation has been given with respect to an example in which the present invention is applied to a grinder. However, even if the present invention is applied to any electric power tool with an induction motor as a power source, the same effect as that obtained in the above-described embodiment can be obtained.

Moreover, the induction motor may be a three-phase motor as in the above-described embodiment, or a single-phase motor. In a case where the induction motor is the single-phase motor, the switching circuit may be constituted as a so-called H-Bridge circuit having four switching elements.

What is claimed is:

1. An electric power tool comprising:
  a tool main body;
  an induction motor configured to generate a power of the electric power tool;
  a power supply unit configured to rectify an alternating-current voltage supplied from an external alternating-current power source and generate a drive voltage for driving the induction motor; and
  an inverter configured to receive supply of the drive voltage from the power supply unit and drive the induction motor,
  wherein the power supply unit and the inverter are integrally incorporated in the tool main body together with the induction motor,
  wherein the induction motor includes at least one phase winding,
  wherein the power supply unit includes a rectifier circuit configured to perform full-wave rectification of the alternating-current voltage and output a full-wave rectified voltage as an output voltage,
  wherein the inverter includes:
    an output voltage detection circuit configured to detect a level of the output voltage outputted from the rectifier circuit;
    a switching circuit having a plurality of switching elements configured to apply the output voltage outputted from the rectifier circuit to the at least one phase winding of the induction motor; and
    a control unit configured to perform a drive control of each of the plurality of switching elements so that a rotation speed of the induction motor becomes a predetermined speed,
  wherein the control unit includes:
    a drive frequency calculation unit configured to set a drive frequency of the induction motor, based on a rotation speed of the induction motor and a slip frequency of the induction motor;
    a drive unit configured to drive each of the plurality of switching elements depending on the drive frequency set by the drive frequency calculation unit; and
    a slip frequency setting unit comprising a slip frequency control table and configured to detect a change in the drive voltage generated by the power supply unit from the level of the output voltage detected by the output voltage detection circuit and set the slip frequency depending on the change in the drive voltage generated by the power supply unit, the slip frequency control table storing slip frequency data corresponding to the level of the output voltage detected by the output voltage detection circuit.

2. The electric power tool according to claim 1, wherein the slip frequency setting unit is configured to set the slip frequency such that the slip frequency becomes low when the output voltage is high and that the slip frequency becomes high when the output voltage is low.

3. The electric power tool according to claim 1, further comprising a zero-cross detection circuit configured to detect each of a plurality of zero-cross points of the alternating-current voltage supplied from the alternating-current power source,
  wherein the slip frequency setting unit is configured to detect, a change in the drive voltage generated by the power supply unit from each of the plurality of zero-cross points detected by the zero-cross detection circuit, so as to set the slip frequency.

4. The electric power tool according to claim 1, further comprising:
  an actual rotation speed detection unit configured to detect an actual rotation speed of the induction motor; and
  a target rotation speed setting unit configured to set a target rotation speed of the induction motor, wherein the drive frequency calculation unit is configured to set the drive frequency of the induction motor, based on the target rotation speed set by the target rotation speed setting unit, the actual rotation speed detected by the actual rotation speed detection unit, and the slip frequency set by the slip frequency setting unit, such that the actual rotation speed of the induction motor becomes the target rotation speed.

5. The electric power tool according to claim 1, further comprising:

an actual rotation speed detection unit configured to detect an actual rotation speed of the induction motor; and a target rotation speed setting unit configured to set a target rotation speed of the induction motor, wherein the drive frequency calculation unit is configured to set the drive frequency of the induction motor, based on the target rotation speed set by the target rotation speed setting unit, the actual rotation speed detected by the actual rotation speed detection unit, and the slip frequency set by the slip frequency setting unit, such that the actual rotation speed of the induction motor becomes the target rotation speed.

6. The electric power tool according to claim 2, further comprising:

an actual rotation speed detection unit configured to detect an actual rotation speed of the induction motor; and a target rotation speed setting unit configured to set a target rotation speed of the induction motor, wherein the drive frequency calculation unit is configured to set the drive frequency of the induction motor, based on the target rotation speed set by the target rotation speed setting unit, the actual rotation speed detected by the actual rotation speed detection unit, and the slip frequency set by the slip frequency setting unit, such that the actual rotation speed of the induction motor becomes the target rotation speed.

7. The electric power tool according to claim 3, wherein the slip frequency setting unit is configured to set the slip frequency such that:
when a zero-cross point is detected by the zero-cross detection circuit, the slip frequency is set to have a predetermined maximum frequency;
approximately at a middle point of a time period between the zero-cross point and a next zero-cross point, the slip frequency is set to have a predetermined minimum frequency; and
when the next zero-cross point is detected by the zero-cross detection circuit, the slip frequency is set to have the predetermined maximum frequency.

8. The electric power tool according to claim 7, further comprising:

an actual rotation speed detection unit configured to detect an actual rotation speed of the induction motor; and a target rotation speed setting unit configured to set a target rotation speed of the induction motor, wherein the drive frequency calculation unit is configured to set the drive frequency of the induction motor, based on the target rotation speed set by the target rotation speed setting unit, the actual rotation speed detected by the actual rotation speed detection unit, and the slip frequency set by the slip frequency setting unit, such that the actual rotation speed of the induction motor becomes the target rotation speed.

9. The electric power tool according to claim 3, further comprising:

an actual rotation speed detection unit configured to detect an actual rotation speed of the induction motor; and a target rotation speed setting unit configured to set a target rotation speed of the induction motor, wherein the drive frequency calculation unit is configured to set the drive frequency of the induction motor, based on the target rotation speed set by the target rotation speed setting unit, the actual rotation speed detected by the actual rotation speed detection unit, and the slip frequency set by the slip frequency setting unit, such that the actual rotation speed of the induction motor becomes the target rotation speed.

* * * * *